Sept. 29, 1931.   M. WALTER   1,824,849
LIFTING MECHANISM FOR SNOWPLOWS FOR MOTOR VEHICLES
Filed April 18, 1929   2 Sheets-Sheet 1
Fig.1
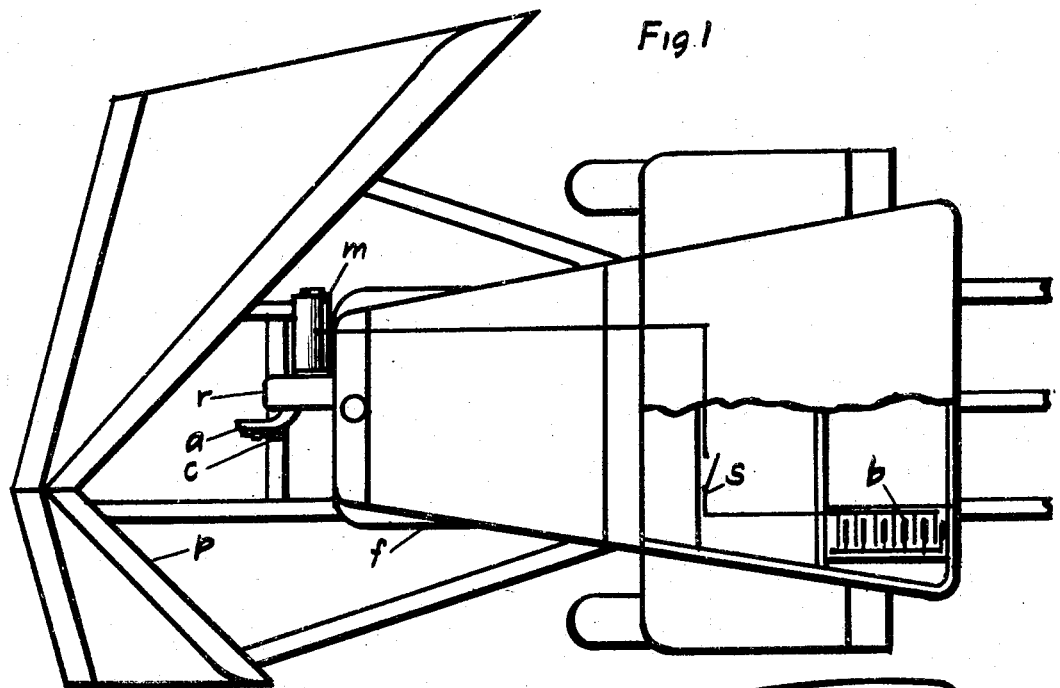
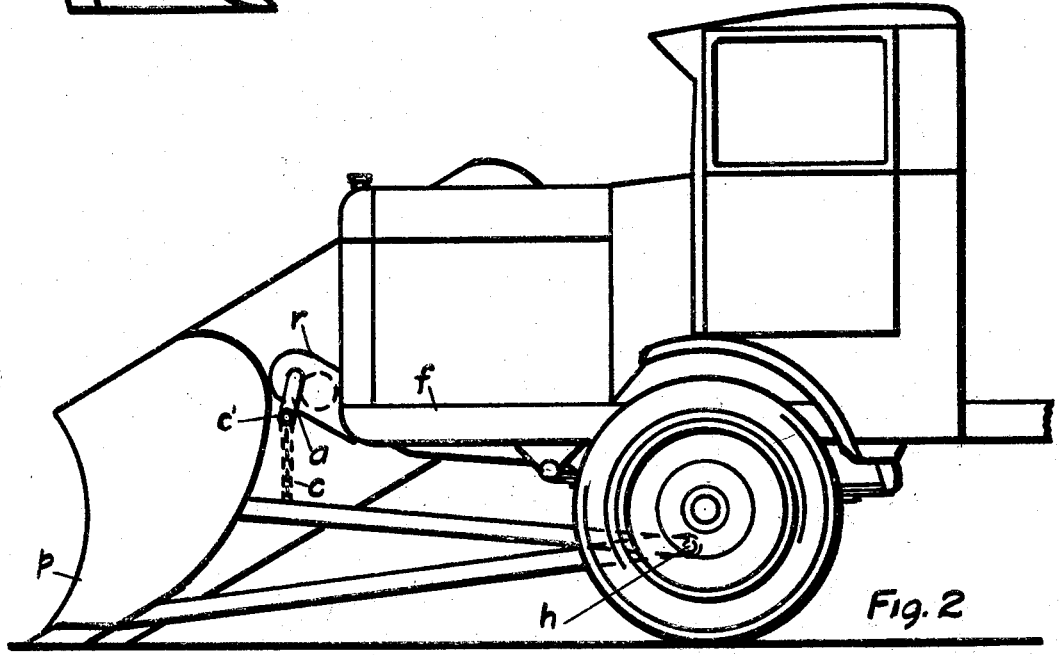
Fig. 2
INVENTOR.
Maurice Walter
BY
Redding, Greeley, O'Shea & Campbell
his ATTORNEYS Sept. 29, 1931.   M. WALTER   1,824,849
LIFTING MECHANISM FOR SNOWPLOWS FOR MOTOR VEHICLES
Filed April 18, 1929   2 Sheets-Sheet 2
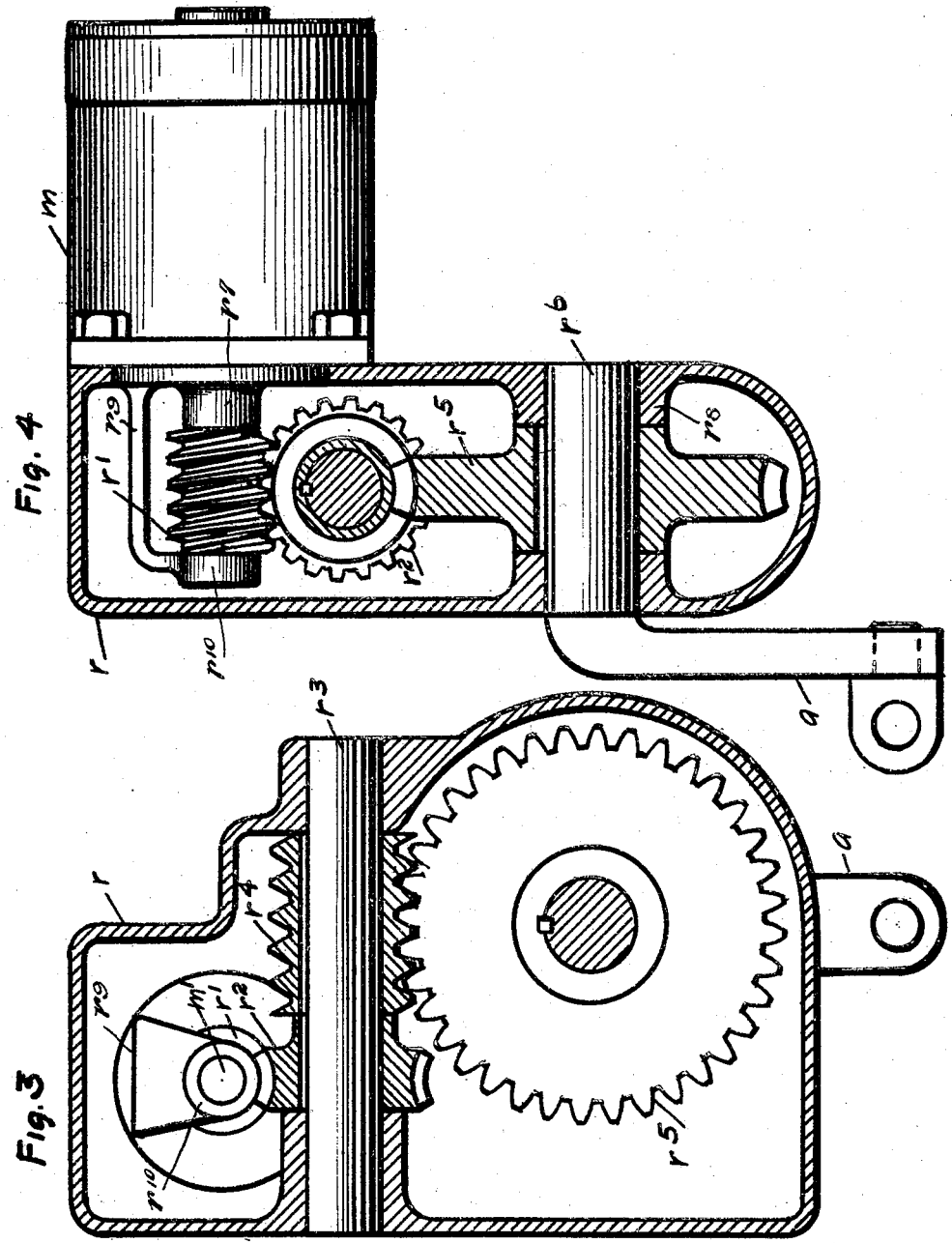
INVENTOR.
Maurice Walter
BY
Redding, Greeley, O'Shea & Campbell
his ATTORNEYS Patented Sept. 29, 1931

1,824,849

UNITED STATES PATENT OFFICE

MAURICE WALTER, OF NEW YORK, N. Y.

LIFTING MECHANISM FOR SNOWPLOWS FOR MOTOR VEHICLES

Application filed April 18, 1929. Serial No. 356,027.

This invention relates to improved power mechanism for raising and lowering snow plows on motor vehicles.

The principal object of the invention is to provide improved power mechanism under the control of the operator for raising and lowering the plow quickly and conveniently by means which are simple and certain in operation. This object of the invention is accomplished in the preferred embodiment by means of an electric motor, the circuit of which is controlled by the operator and the armature of which is geared, through reduction gearing, preferably of worm and wheel type, to a crank arm which revolves unidirectionally and is operatively connected to the plow. Rotation of the crank arm in one direction through 180° may raise the plow while continued rotation of the arm in the same direction may lower the plow. The mechanism for accomplishing this result is especially designed in the interest of lightness, compactness, accessibility and ruggedness so that it will best lend itself to the needs of motor vehicle practice.

These and other objects of the invention will appear more particularly hereinafter in connection with the illustrated embodiment shown in the drawings, wherein:

Figure 1 is a plan view showing in somewhat conventional form a snow plow mounted at the front end of a motor vehicle and having the improved lifting mechanism associated therewith.

Figure 2 is a view in side elevation of the parts shown in Figure 1.

Figure 3 is a detailed side view, partly in section, showing the double reduction gearing.

Figure 4 is an end view, partly in section, showing the reduction gearing and the motor.

The front end of a vehicle is shown diagrammatically at $f$, with a snow plow $p$ pivoted thereto at $h$. A chain $c$ is swivelled at $c'$ on the end of crank arm $a$ of the lifting mechanism and is attached at its other end to the plow forward of the pivot. The mechanism for raising and lowering the forward end of the plow consists of an electric motor $m$, the circuit of which may be connected to a battery $b$ and controlled through switch $s$. Reduction gearing in gear box $r$ is operatively interposed between the armature of the motor and the crank arm $a$. In order to effect a large reduction, of say 1 to 1000, with but few gears, a worm $r'$ is mounted on the armature shaft $m'$ of the motor for driving a worm wheel $r^2$ on shaft $r^3$, to which is fixed a second worm $r^4$ for driving worm wheel $r^5$ fixed to shaft $r^6$. Arm $a$ may be formed integral with shaft $r^6$ and approximately at right angles thereto. Housing $r$ is formed with a bearing $r^7$ in which shaft $m'$ is journaled, and bearings $r^8$ in which shaft $r^6$ is journaled. A bracket $r^9$ is formed in the housing carrying a bearing $r^{10}$ cooperating with bearing $r^7$ to journal the shaft $m'$.

In the operation of the above described device there is no need for an automatic cutout switch for the motor, as compared to the previously known types of mechanism wherein a chain is wound on a drum, for when the arm $a$ of the present construction has rotated 180° to its top point it will then automatically descend if the operator fails to open the switch $s$. Any chance of breakage due to winding the chain too tight is thus eliminated, since the chain $c$ is not wound on a drum, but is swivelled on arm $a$. When the operator desires to maintain the plow in raised position, switch $s$ may be opened just when arm $a$ reaches top center. It is apparent that in this position the load acts vertically through shaft $r^6$, thus minimizing the forces on said shaft and eliminating horizontal components and moments. Moreover, the double worm reduction gearing automatically locks the plow in any desired position upon opening the switch $s$, thus avoiding the use of the separate locking devices necessary when pinion gears are used. In short, the mechanism constituting the present invention embodies simplicity, ruggedness, compactness and efficiency hitherto unattained in devices for the present purpose.

I claim as my invention:

In combination with a vehicle, a snow plow, means to pivot the plow upon the vehicle, means to raise and lower the forward end of the plow comprising an arm, a connection between the arm and the plow, a uni-directionally operating electric motor for rotating the arm, a housing, a worm journaled in the housing and driven by the motor, a shaft journaled at its ends in the housing, a worm wheel on the shaft engaging the first worm, a worm on the shaft, and a worm wheel secured to the arm and engaging the second worm.

This specification signed this 9th day of April, A. D. 1929.

MAURICE WALTER.